(12) United States Patent
Karaki

(10) Patent No.: US 7,903,327 B2
(45) Date of Patent: Mar. 8, 2011

(54) FLUORESCENCE MICROSCOPE APPARATUS

(75) Inventor: Kenji Karaki, Ina (JP)

(73) Assignee: Olympus Corporation, Tokyo (JP)

( * ) Notice: Subject to any disclaimer, the term of this patent is extended or adjusted under 35 U.S.C. 154(b) by 327 days.

(21) Appl. No.: 12/100,114

(22) Filed: Apr. 9, 2008

(65) Prior Publication Data
US 2008/0252966 A1 Oct. 16, 2008

(30) Foreign Application Priority Data

Apr. 12, 2007 (JP) ................... 2007-104700

(51) Int. Cl.
*G02B 21/00* (2006.01)
(52) U.S. Cl. .................. 359/368; 359/510; 359/513
(58) Field of Classification Search ........ 359/368–390, 359/510, 513
See application file for complete search history.

(56) References Cited

U.S. PATENT DOCUMENTS

| | | | |
|---|---|---|---|
| 4,311,358 A | | 1/1982 | Gibbons et al. |
| 4,405,202 A | * | 9/1983 | Kimball ................. 359/513 |
| 4,452,527 A | | 6/1984 | Turner et al. |
| 6,215,586 B1 | | 4/2001 | Clark |
| 7,649,686 B2 | * | 1/2010 | Harada et al. ............ 359/391 |
| 2005/0237604 A1 | * | 10/2005 | Kawano et al. ........... 359/368 |
| 2006/0050276 A1 | | 3/2006 | Tsuyuki et al. |

FOREIGN PATENT DOCUMENTS

| | | |
|---|---|---|
| DE | 542371 | 12/1931 |
| DE | 2348567 A1 | 4/1975 |
| EP | 0078774 A1 | 5/1983 |
| JP | 2006-071544 | 3/2006 |

OTHER PUBLICATIONS

European Search Report dtd Jul. 14, 2008, in corresponding foreign application, 6 pp.

* cited by examiner

*Primary Examiner* — Thong Nguyen
(74) *Attorney, Agent, or Firm* — Pillsbury Winthrop Shaw Pittman, LLP

(57) ABSTRACT

A clear fluorescence image is obtained by preventing external light from mixing with weak fluorescence emitted from a specimen, while reducing the size of the overall apparatus. The invention provides a fluorescence microscope apparatus including a stage for mounting a specimen; an objective lens for collecting fluorescence from the specimen; a moving mechanism for relatively moving the stage and the objective lens; a first cover member secured to the objective lens; a second cover member, provided at the stage, for enclosing a tip of the objective lens and a space above the stage, together with the first cover member; and a light-blocking member allowing relative movement of the first and second cover members while preventing leakage of light from a gap between the two cover members.

4 Claims, 11 Drawing Sheets

FLUORESCENCE MICROSCOPE APPARATUS

BACKGROUND OF THE INVENTION

1. Field of the Invention

The present invention relates to fluorescence microscope apparatuses for fluoroscopy of specimens such as biological tissue.

This application is based on Japanese Patent Application No. 2007-104700, the content of which is incorporated herein by reference.

2. Description of Related Art

In the related art, there are known fluorescence observation apparatuses that irradiate a specimen with excitation light, such as laser light, and observe fluorescence emitted from the specimen (for example, see Japanese Unexamined Patent Application, Publication 2006-71544).

To prevent the problem of difficulty in acquiring a clear fluorescence image due to external light mixing with the weak fluorescence from the specimen, the entire fluorescence observation apparatus is covered by a black box for performing fluoroscopy.

However, the black box for fluoroscopy disclosed in Japanese Unexamined Patent Application, Publication No. 2006-71544 covers the entire fluorescence observation apparatus, resulting in the problem of increased apparatus size. In particular, in microscope apparatuses with a compact main body whose angle can be changed and in which the objective lens can be brought close to the specimen from any direction, even though the microscope main body itself can be reduced in size with some effort, it is necessary to provide a large fluoroscopy black box which covers the entire movable range of the microscope main body, resulting in the problem that it is not possible to reduce the size of the entire system.

BRIEF SUMMARY OF THE INVENTION

The present invention has been conceived in light of the circumstances described above, and an object thereof is to provide a fluorescence microscope apparatus with a compact configuration which can obtain a clear fluorescence image by preventing external light from mixing with weak fluorescence emitted from a specimen.

In order to realize the object described above, the present invention provides the following solutions.

A fluorescence microscope apparatus of a first aspect according to the present invention includes a stage configured to mount a specimen; an objective lens configured to collect fluorescence from the specimen; a moving mechanism configured to relatively move the stage and the objective lens; a first cover member secured to the objective lens; a second cover member, provided at the stage side and configured to enclose, together with the first cover member, a tip of the objective lens and a space above the stage; and a light-blocking member configured to allow relative movement of the first and second cover members and prevent leakage of light from a gap between the two cover members.

According to the aspect described above, by mounting the specimen to the stage and relatively moving the objective lens and the stage by operating the moving mechanism, it is possible to align the objective lens at a desired examination site on the specimen and to collect fluorescence emitted from the specimen. In this case, the space above the stage, which contains the tip of the objective lens, is covered by combining the first cover member which is fixed to the objective lens side and the second cover member which is provided at the stage side.

The light-blocking member provided between the first and second cover members prevents the leakage of light from the gap therebetween even when the first cover member and the second cover member are moved relative to each other due to relative movement of the objective lens and the stage. Therefore, it is possible to substantially reduce the amount of external light mixing with the weak fluorescence emitted from the specimen, and it is thus possible to perform clear fluorescence observation.

In the aspect described above, the light-blocking member may be formed by overlapping the first cover member and the second cover member in a relative movement direction thereof, with a minute gap provided therebetween in a direction orthogonal to the relative movement direction thereof.

With this configuration, even if relative movement occurs between the first cover member and the second cover member due to relative movement of the objective lens and the stage, the light-blocking member maintains the minute gap between the first cover member and the second cover member and overlaps them in the relative movement direction. Therefore, it is possible to easily prevent the direct intrusion of external light into the space enclosed by the first and second cover members, regardless of the relative position of the objective lens with respect to the specimen on the stage, and therefore, it is possible to perform clear fluorescence observation.

In the aspect described above, the light-blocking member may be formed of a bellows member which connects the first cover member and the second cover member.

By doing so, even if relative movement occurs between the first cover member and the second cover member due to relative movement of the objective lens and the stage, the light-blocking member formed of the bellows member is elastically deformed, so that it is possible to reliably prevent the intrusion of external light into the space enclosed by the first and second cover members, regardless of the relative position of the objective lens with respect to the specimen on the stage, and therefore, it is possible to perform clear fluorescence observation.

In the aspect described above, the second cover member may be constituted of a part of the stage.

With this configuration, it is possible to reduce the number of parts.

The configuration described above may further include an angle-changing mechanism configured to change the angle of the objective lens relative to the specimen, and the light-blocking member may keep the gap between the first cover member and the second cover member substantially constant, regardless of changes in the angle of the objective lens relative to the specimen due to the angle-changing mechanism.

By doing so, even if relative movement occurs between the first cover member and the second cover member due to a change in the angle of the objective lens relative to the specimen, the light-blocking member maintains the gap between the first cover member and the second cover member substantially constant. Therefore, it is possible to easily prevent the intrusion of external light into the space enclosed by the first and second cover members, and it is thus possible to perform clear fluorescence observation.

In the aspect described above, the angle-changing mechanism may be formed of a specimen-supporting mechanism configured to support the specimen in such a manner as to be capable of changing the angle thereof relative to the stage.

By doing so, it is possible to easily change the angle of the objective lens relative to the specimen.

In the aspect described above, the moving mechanism may move the objective lens and the stage so as to change an angle of the objective lens relative to the stage.

By doing so, the relative angle of the objective lens with respect to the stage can be changed by operating the moving mechanism, and therefore, it is possible to observe the specimen on the stage from various angles. In this case also, the light-blocking member maintains the minute gap between the first cover member and the second cover member and overlaps them in the relative movement direction. Thus, it is possible to easily prevent the direct intrusion of external light into the space enclosed by the first and second cover members, regardless of the relative angle of the objective lens with respect to the specimen on the stage, and it is possible to perform clear fluorescence observation.

In the aspect described above, the moving mechanism may rotate the objective lens about a prescribed axis, and the light-blocking member may be formed in the shape of a rotational body defined by rotating the first cover member and the second cover member about the prescribed axis.

With this configuration, even when the objective lens is made to rotate about the prescribed axis relative to the stage by operating the moving mechanism, the minute gap between the first and second cover members, which are formed in the shape of rotational bodies centered on that axis, is maintained. Accordingly, it is possible to easily prevent the direct intrusion of external light into the space enclosed by the first and second cover members, regardless of the relative angle of the objective lens with respect to the specimen on the stage, and therefore, it is possible to perform clear fluorescence observation.

The aspect described above may further include a specimen supporting mechanism configured to support the specimen in such a manner as to be capable of changing the angle of the specimen relative to the stage.

By doing so, even if the relative angle of the objective lens with respect to the stage is not changed using the moving mechanism, it is possible to change the angle of the specimen relative to the stage by operating the specimen supporting mechanism. As a result, it is possible to simplify the construction of the moving mechanism and the light-blocking member.

The present invention affords an advantage in that it is possible to obtain a clear fluorescence image by preventing external light from mixing with weak fluorescence emitted from a specimen, while reducing the overall size of the apparatus.

DETAILED DESCRIPTION OF THE INVENTION

A fluorescence microscope apparatus 100 according to an embodiment of the present invention will be described below with reference to FIG. 1.

The fluorescence microscope apparatus 100 according to this embodiment is suitable for examining the interior of living organism specimens such as laboratory animals, for example, mice.

Figure 1:
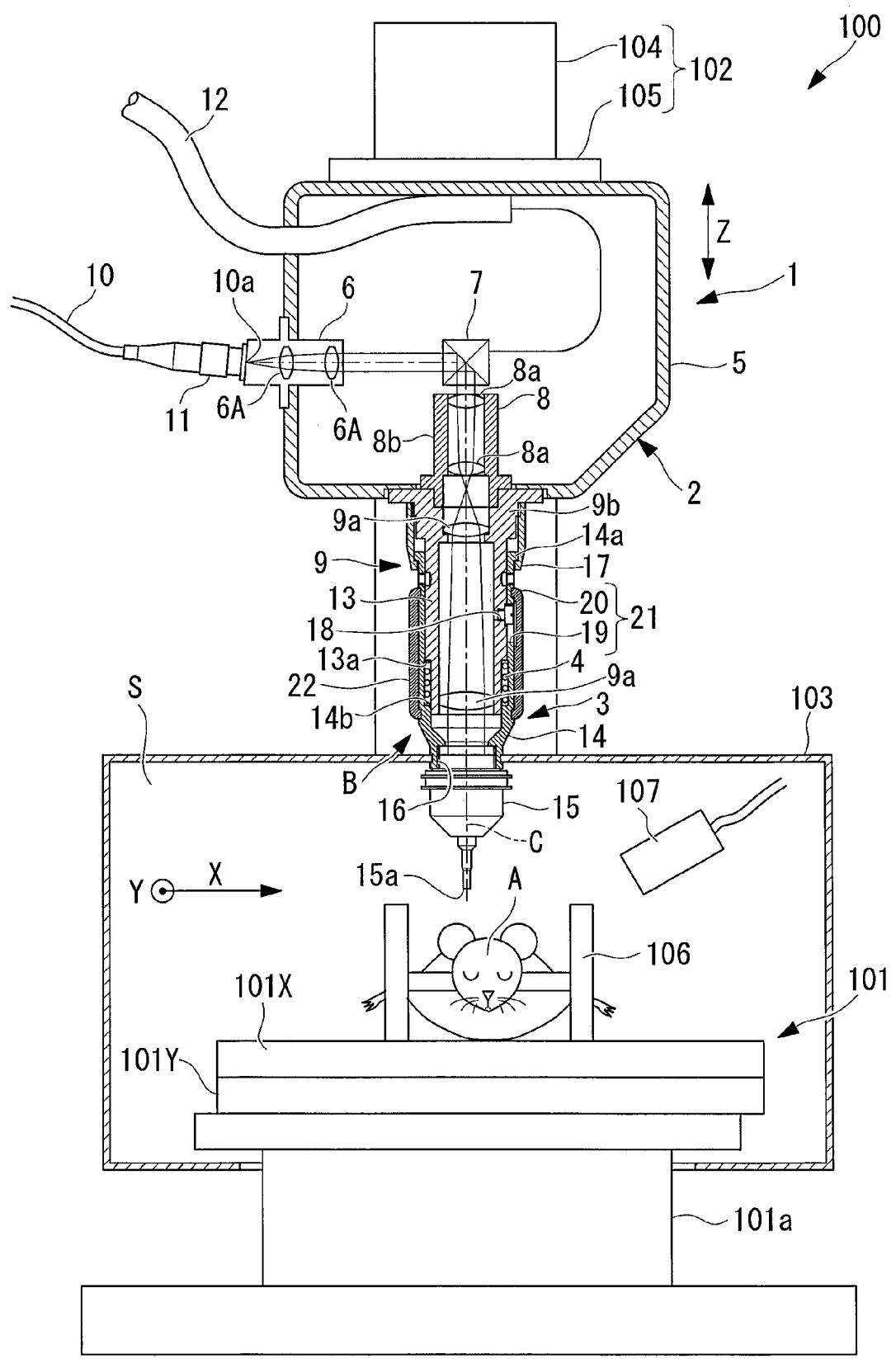
FIG. 1 is a longitudinal sectional view of a fluorescence microscope apparatus according to an embodiment of the present invention.

As shown in FIG. 1, the fluorescence microscope apparatus 100 according to this embodiment includes a stage 101 for mounting a specimen A, a microscope main body 1 provided with an objective lens unit 15, a moving mechanism 102 for moving the microscope main body 1 in a direction parallel to the optical axis thereof, and a cover member (first cover member) 103 which is secured to the microscope main body 1.

The moving mechanism 102 includes a support stand 104 disposed vertically and a slider 105 which is provided so as to be capable of moving up and down along the support stand 104 and to which the microscope main body 1 is secured. By moving the slider 105 up and down (in the Z direction), the microscope main body 1 is moved up and down, which enables a tip 15a of the objective lens unit 15 to be moved in the optical axis direction closer to and farther away from the specimen A secured on the stage 101.

The cover member 103 is secured to the objective lens unit 15 of the microscope main body 1 close to the threaded mount. The cover member 103 is formed in the shape of a box which encloses a space S containing the tip 15a of the objective lens unit 15, and the lower end thereof wraps around below the stage 101, which extends horizontally, and is disposed such that a minute gap is provided between it and a base 101a of the stage 101 in the horizontal direction.

Above the base 101a, the stage 101 includes movable parts 101X and 101Y which can move in two horizontal directions (the X-direction and the Y-direction), and the specimen A can be securely mounted to the stage 101 with an immobilizing member 106 provided on the top surface of the movable parts 101X and 101Y. Therefore, by driving the movable parts 101X and 101Y of the stage 101 to move the specimen A in two horizontal directions in the internal space S inside the cover member 103 and by operating the moving mechanism 102 to move the microscope main body 1 vertically, it is possible to position the tip 15a of the objective lens unit 15 opposite a desired examination site on the specimen A.

An illumination device 107 as an accessory device for confirming the positional relationship between the objective lens and the specimen A, and the like, in a black box is disposed inside the cover member 103.

Within the working range provided by the moving mechanism 102 for the microscope main body 1, the lower end of the cover member 103 is located at a position abutting the base 101a of the stage 101, before the tip 15a of the objective lens unit 15 abuts against the stage 101, effectively acting as a stopper to prevent damage to the objective lens unit 15 due to the tip 15a of the objective lens unit 15 hitting the stage 101.

The microscope main body 1 in this embodiment will be described in detail below.

The microscope main body 1 includes an apparatus frame 2; an objective lens mounting unit 3, which is capable of moving in the direction of an optical axis C in the apparatus frame 2; the objective lens unit 15, which is mounted to the objective-lens mounting unit 3; and an urging member 4 disposed between the apparatus frame 2 and the objective-lens mounting unit 3.

The apparatus frame 2 includes a frame case 5, a collimator unit 6 secured to the frame case 5, a light-scanning unit 7 for two-dimensionally scanning light collimated by the collimator unit 6, a pupil-projection lens unit 8 which converges the light scanned by the light-scanning unit 7 to form an intermediate image, and an image-forming lens unit 9 for collecting and collimating the light forming the intermediate image.

An end of an optical fiber 10 for guiding light from a light source (not shown) is attached to the collimator unit 6 by a connector 11. The connector 11 is attached to the collimator unit 6 at a slight angle with respect to the optical axis. Thus, an exit face 10a of the optical fiber 10 is inclined at an angle with respect to the longitudinal direction, thus preventing light reflected inside the optical fiber 10 at the exit face 10a from returning to a detector (not shown in the drawing) provided at the light source side. The light emerging from the exit face 10a of the optical fiber 10 is collected upon passing through a lens 6A of the collimator unit 6 and is converted to collimated light.

The light-scanning unit 7 is formed of two closely positioned galvanometer mirrors (not shown in the drawing) which are supported so as to be capable of rocking back and forth about two orthogonal axes, that is to say, so-called proximity galvanometer mirrors. Each galvanometer mirror can be rocked back and forth at a prescribed speed by an actuator (not shown) in response to a control signal sent from an external control unit (not shown) via a cable 12. By doing so, the collimated light is scanned two-dimensionally.

A barrel 8b holding lenses 8a of the pupil-projection lens unit 8 is secured to a barrel 9b holding a lens 9a of the image-forming lens unit 9, and the barrel 9b of the image-forming lens unit 9 is secured to the frame case 5. The barrel 9b of the image-forming lens unit 9 includes a substantially cylindrical fixed-side cylinder portion 13.

The objective-lens mounting unit 3 includes a movable-side cylinder portion 14 which is engaged with the outside of the fixed-side cylinder portion 13 in such a manner as to be capable of moving in the axial direction. A collar 14a which extends outward in the radial direction is provided at one end of the movable-side cylinder portion 14. A threaded portion 16 for mounting the objective lens unit 15 is provided at the other end of the movable-side cylinder portion 14.

A holder 17 which mates with the collar 14a of the objective-lens mounting unit 3 is fixed to the barrel 9b of the image-forming lens unit 9. A screw hole 18 is formed in the radial direction in the outer face of the fixed-side cylinder portion 13. An elongated hole 19 which extends over a prescribed length in the axial direction is formed at a position corresponding to the screw hole 18 in the movable-side cylinder portion 14. A bolt 20 is screwed into the screw hole 18 through the elongated hole 19. The elongated hole 19 has a slightly larger width than the diameter of the head of the bolt 20. Therefore, the head of the bolt 20 can relatively move in the axial direction inside the elongated hole 19, while preventing relative movement between the elongated hole 19 and the bolt 20 in the circumferential direction. This configuration constitutes a rotation-preventing mechanism 21.

Reference numeral 22 in FIG. 1 is a cover member for covering the head of the bolt 20 and the elongated hole 19. By gripping the cover member 22, made of rubber for example, when attaching and removing the objective lens unit 15, the objective-lens mounting unit 3 to which the objective lens unit 15 is attached can be held in a non-slip manner so that the objective lens unit 15 can be easily attached and detached. The cover member 22 covers the entire elongated hole 19 provided in the movable-side cylinder portion 14, thus preventing dust from getting inside the elongated hole 19. Furthermore, the external appearance is improved by covering the elongated hole 19 and the bolt 20.

Stepped portions 13a and 14b, which are positioned at mutually opposing locations in the axial direction, are respectively formed around the entire circumference on an outer surface of the fixed-side cylinder portion 13 and an on inner surface of the movable-side cylinder portion 14. A coil spring constituting the urging member 4 (hereinafter referred to as coil spring 4) is interposed between these stepped portions 13a and 14b. The coil spring 4 is compressed by a certain amount to constantly urge the stepped portions 13a and 14b in directions that widen the distance therebetween, even when the distance between the stepped portions 13a and 14b is at its maximum extent.

In other words, the objective-lens mounting unit 3 is urged in a direction towards the front end thereof by the elastic force of the coil spring 4, so that the collar 14a provided at the rear end thereof abuts against the holder 17. By doing so, any displacement above this amount towards the front end along the optical axis C is restricted, and thus the position thereof is accurately set. In addition, when the tip 15a of the objective lens unit 15 is pressed in the optical axis C direction against an object other than the specimen A and the pressing force thereof exceeds the elastic force of the coil spring 4, the objective-lens mounting unit 3 can be moved so that it is pushed back towards the rear end along the optical axis C relative to the barrel 9b of the image-forming lens unit 9.

In this case, the relative displacement of the objective-lens mounting unit 3 in the optical axis C direction relative to the barrel 9b of the image forming lens unit 9 is achieved so as to change the optical path length at position B where the light emitted from the image-forming lens unit 9 is collimated.

The operation of the fluorescence microscope apparatus 100 according to this embodiment, configured in this way, will be described below.

To use the fluorescence microscope apparatus 100 according to this embodiment, first the specimen A, which is a biological organism such as a small laboratory animal in which an incision has been made at an examination site, is secured on the stage 101 with the immobilizing member 106 and is accommodated inside the cover member 103. The cover member 103 encloses the space S above the stage 101 which contains the tip 15a of the objective lens unit 15. Because the lower end of the cover member 103 is disposed so that there is a minute gap between it and the base (second cover member) 101a of the stage 101, external light can enter the interior of the cover member 103 only through this minute gap. However, because the cover member 103 has a shape that wraps around below the horizontal stage 101, the amount of external light entering the cover member 103 is extremely low.

The illumination device 107 inside the cover member 103 is operated in this state, the light scanning unit 7 is operated, and the stage 101 and the moving mechanism 102 are moved while observing the reflected light from the specimen A. Accordingly, because the tip 15a of the objective lens unit 15 is located at a position opposite the examination site, excitation light from the light source enters the apparatus frame 2 from the optical fiber 10, and the light-scanning unit 7 is operated.

After the excitation light from the light source propagates through the optical fiber 10, it is guided inside the apparatus frame 2 via the connector 11. Because the collimator unit 6 is fixed to the apparatus frame 2, the excitation light emitted from the exit face 10a of the optical fiber 10 to the interior of the frame case 5 is converted to collimated light upon passing through the lens 6A of the collimator unit 6.

The excitation light converted to collimated light is then incident on the light-scanning unit 7. The light-scanning unit 7 deflects the excitation light by 90° (in FIG. 1, the horizontally incident excitation light is deflected in the vertical direction) by rocking the proximity galvanometer mirrors back and forth, thus two-dimensionally scanning the light. The scanned excitation light forms an intermediate image by passing through the pupil-projection lens unit 8 and is then converted to collimated light upon passing through the image-forming lens unit 9. Then, the collimated light emitted from the image-forming lens unit 9 enters the objective lens unit 15 and is re-imaged at a focal position a prescribed working distance in front of the tip 15a thereof.

When the excitation light is incident on the specimen A, a fluorescent substance present in the specimen A is excited, generating fluorescence. The generated fluorescence returns inside the objective lens unit 15 via the tip 15a of the objective lens unit 15, enters the optical fiber 10 via the image-forming lens unit 9, the pupil-projection lens unit 8, the light-scanning unit 7, and the collimator unit 6, and returns to the light source side. At the light source side, the fluorescence is split off from the excitation light by a dichroic mirror (not shown in the drawing) and is detected by a light detector (not shown in the drawing), for example, a photomultiplier tube (PMT). Then, the detected fluorescence is converted to an image, which is displayed on a monitor.

If the optical fiber 10 has a sufficiently small core diameter, such as a single-mode fiber, the end of the optical fiber 10 is in a conjugate positional relationship with the image position of the objective lens unit 15, thus constituting a confocal optical system. Therefore, only fluorescence generated in the vicinity of the image position of the objective lens unit 15 enters the optical fiber 10, which makes it possible to obtain a high-resolution image. If the optical fiber 10 has a larger core diameter, although the resolution decreases, it is possible to obtain a bright image with greater depth.

When the apparatus frame 2 and the objective lens unit 15 are moved in the direction of the optical axis C thereof to find a desired observation position while looking at the acquired image, the image-forming position of the excitation light is also moved in the direction of the optical axis C, and as a result, it is possible to change the observation position in the depth direction.

In this case, when the tip 15a of the objective lens unit 15 abuts against any object inside the specimen A, such as comparatively solid tissue, a pressing force is applied to the tip 15a of the objective lens unit 15.

Then, when that pressing force exceeds the elastic force of the coil spring 4, as shown in FIG. 1, the coil spring 4 is deformed in the compression direction, and the objective lens unit 15 and the objective-lens mounting unit 3 thus shift in the optical axis C direction relative to the apparatus frame 2. Therefore, it is possible to prevent an excessively large pressing force from being applied to the tip 15a of the objective lens unit 15, thus preventing damage to the objective lens unit 15 and the specimen A opposing it.

In this case, with the fluorescence microscope apparatus 100 according to this embodiment, because a shock absorbing mechanism including the coil spring 4 described above is provided at the apparatus frame 2 side rather than close to the tip 15a of the objective lens unit 15, it is possible to simplify the construction in the vicinity of the tip 15a of the objective lens unit 15, allowing the diameter to be reduced. Therefore, when observing the interior of the specimen A, such as a living organism, it is possible to minimize the size of an incision made for inserting the tip 15a of the objective lens unit 15.

As a result, the burden placed on the specimen A can be reduced, and the specimen A can be maintained in a healthy state for a long period of time. In other words, it is possible to perform continuous in viva examination of the specimen A, such as a living organism, for a long period of time with the tip 15a of the objective lens unit 15 inserted in the specimen A.

With the fluorescence microscope apparatus 100 according to this embodiment, which is not provided with a shock-absorbing mechanism in the objective lens unit 15, when the objective lens unit 15 is replaced and another one having a different magnification and tip shape is attached to the objective-lens mounting unit 3, because it is not necessary to provide a shock-absorbing mechanism on each objective lens unit 15, an advantage is afforded in that it is possible to reduce the cost of the overall apparatus. Also, because the objective lens unit 15 is not provided with any movable parts in a shock-absorbing mechanism, it is possible to easily construct the objective lens unit 15 with a watertight construction. Therefore, it is possible to provide a fluorescence microscope apparatus 100 which is suitable for observation with the tip 15a of the objective lens unit 15 inserted inside a specimen A that contains liquid, such as bodily fluids.

With the fluorescence microscope apparatus 100 according to this embodiment, when shifting the objective lens unit 15 relative to the apparatus frame 2, the optical path length is changed at position B where light emitted from the image-forming lens unit 9 is collimated. Therefore, even though the objective lens unit 15 shifts in the optical axis C direction, the image forming relationship does not change.

In other words, when the tip 15a of the objective lens unit 15 presses against the specimen A, even though the objective lens unit 15 is pushed back in the optical axis C direction by that pressing force, the focus condition of the image displayed on the monitor does not change at all. Therefore, by ensuring an adequate amount of relative shifting of the objective lens unit 15 with respect to the apparatus frame 2, it is possible to perform examination of the same site while displacing the objective lens unit 15 relative to the apparatus frame 2.

For example, when the specimen A is a living organism such as a mouse, when performing in vivo examination, the surface of the specimen A tends to move due to the heartbeat, pulsing of the veins, breathing, etc. In such a case, by using the fluorescence microscope apparatus 100 according to this embodiment, the tip 15a of the objective lens 15 is pressed against the specimen A, and observation is performed with the objective lens unit 15 pushed back slightly towards the apparatus frame 2.

By doing so, when the specimen A is pressed by the pressing force of the objective lens unit 15 and the pulsing force is greater than this force, it is possible to perform observation while shifting the objective lens unit 15 so as to follow the pulsing motion. In this case, because the image forming relationship does not change even though the objective lens unit 15 shifts, it is possible to continuously display a clear, in-focus image.

With the fluorescence microscope apparatus 100 according to this embodiment, because the objective lens unit 15 is attached and detached at the position B where the light emerging from the image-forming lens unit 9 is collimated, the objective lens unit 15 which is attached and detached constitutes an infinity optical system. Therefore, by making the threaded portion 16 of the objective-lens mounting unit 3 to the same standard type as the threaded portion normally used in microscopes, it is also possible to attach and detach the objective lens unit of a standard microscope.

With the fluorescence microscope apparatus 100 according to this embodiment, the head of the bolt 20 secured to the fixed-side cylinder portion 13 is located inside the elongated hole 19 formed in the movable-side cylinder portion 14 and rotation of the objective-lens mounting unit 3 in the circumferential direction relative to the apparatus frame 2 is prevented. Therefore, it is possible to prevent variations in the optical characteristics of the overall apparatus due to relative rotation of the objective lens unit 15 and the image-forming lens unit 9. In addition, because rotation of the objective-lens mounting unit 3 is prevented when attaching and detaching the objective lens unit 15 to the threaded portion 16 provided on the objective-lens mounting unit 3, an advantage is afforded in that it facilitates the attaching and detaching procedure.

With the fluorescence microscope apparatus 100 according to this embodiment, because the space S above the stage 101, including the tip 15*a* of the objective lens unit 15, is enclosed by the cover member 103, it is possible to effectively prevent the excitation light, such as laser light, emitted from the tip 15*a* of the objective lens unit 15 from leaking outside In particular, because the cover member 103 is provided with a minute gap at the side face of the base 101*a* of the stage 101, it is possible to continuously prevent leakage of excitation light to outside the space S and the entry of external light inside the space S by maintaining the minute gap, regardless of whether the microscope main body 1 is moved up and down with the moving mechanism 102.

With the fluorescence microscope apparatus 100 according to this embodiment, the working range of the moving mechanism 102 is set so that the lower end of the cover member 103 abuts against the base 101*a* before the tip 15*a* of the objective lens unit 15 hits the movable part 101X of the stage 101. Therefore, the cover member 103 functions as a stopper, which can prevent damage to the objective lens unit 15.

In the fluorescence microscope apparatus 100 according to this embodiment, it is possible to adopt the various modifications described below.

Figure 2:
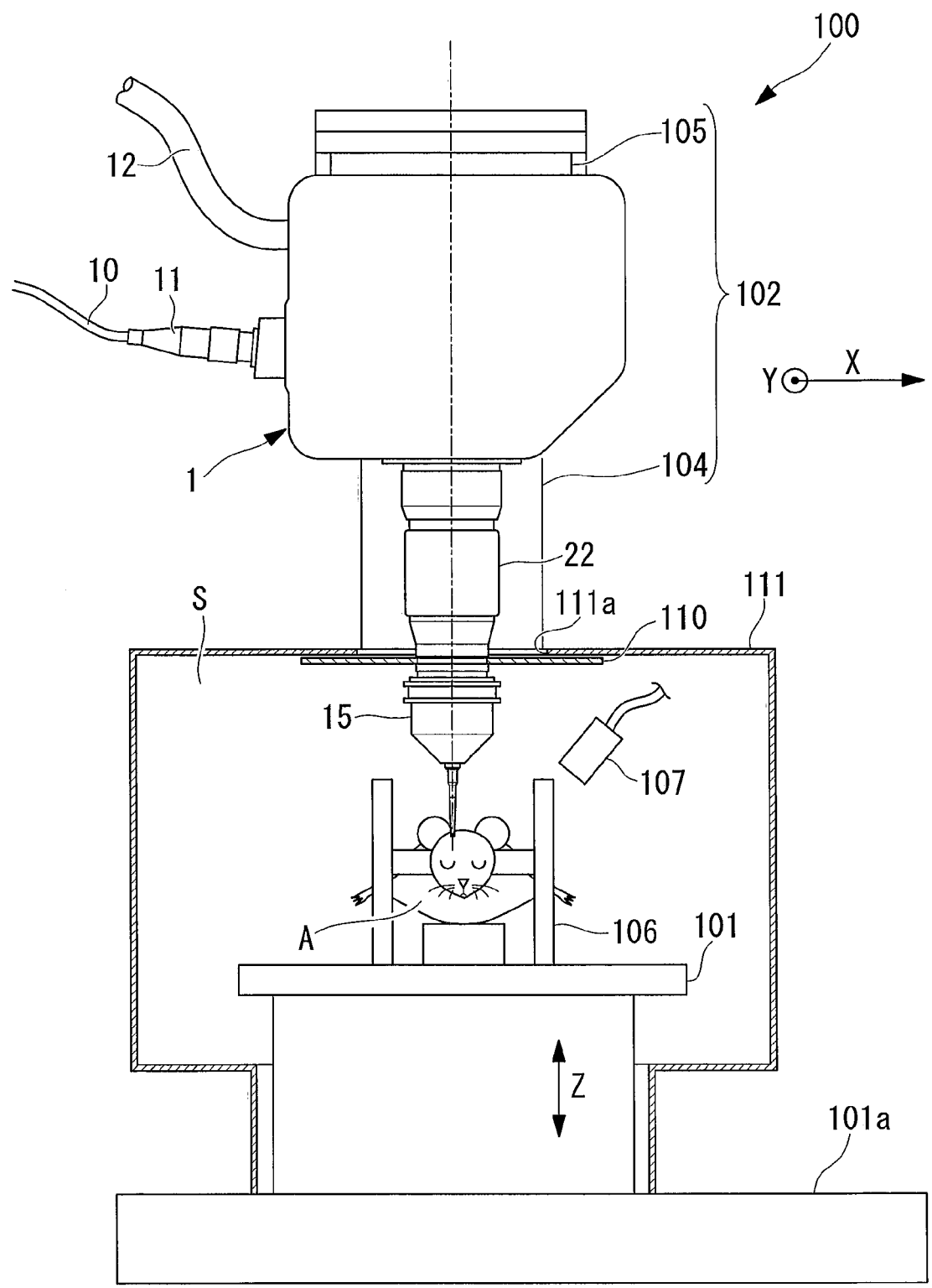
FIG. 2 is a partially cutaway elevational view showing a fluorescence microscope apparatus according to a first modification of the fluorescence microscope apparatus in FIG. 1.

In the example shown in FIG. 2, the stage 101 is driven only in the Z direction, and the slider 105 is provided so as to be capable of moving in two horizontal directions (X and Y directions) relative to the support stand 104.

In this case, a flat-plate-shaped first cover member 110, which is fixed to the objective lens unit 15, and a second cover member 111, which is fixed to the base 101*a* of the stage 101 and which encloses the first cover member 110 and the space S, are provided.

A through-hole 111*a* which is large enough to allow the objective lens unit 15 to pass therethrough is formed at the top of the second cover member 111. The first cover member 110 is located at a position where it closes off the through-hole 111*a* in the second cover member 111 and is disposed so that there is a minute gap between it and the second cover member 111 in the vertical direction.

The first cover member 110 and the second cover member 111 are disposed so as to form an overlapping region in the horizontal direction. By doing so, even when the slider 105 is moved in the two horizontal directions relative to the support stand 104 to shift the position of the objective lens unit 15 relative to the specimen A, the minute gap between the first cover member 110 and the second cover member 111 is maintained, which prevents the entry of external light into the space S and the leakage of excitation light outside the space S.

Figure 3:
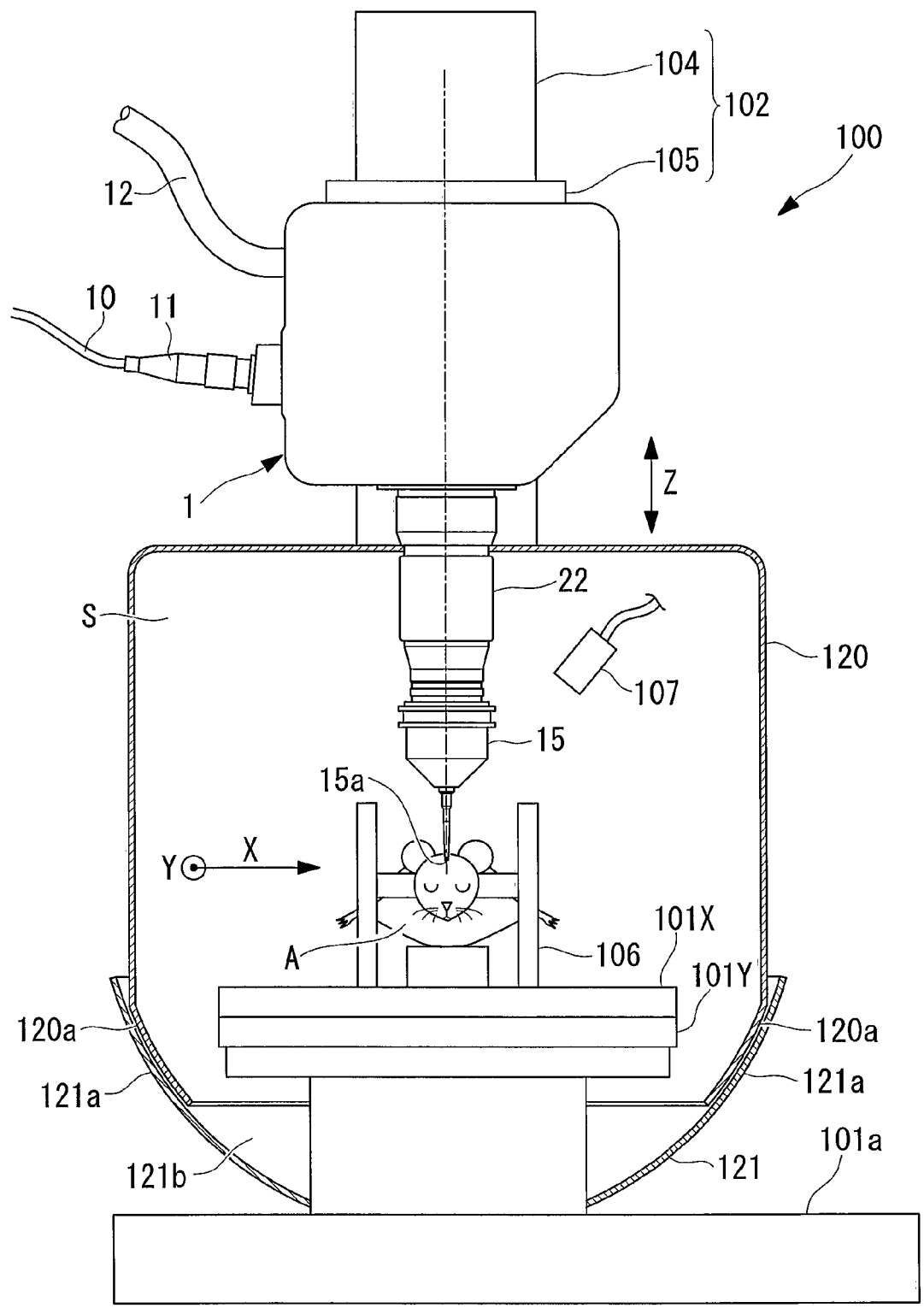
FIG. 3 is a partially cutaway elevational view showing a fluorescence microscope apparatus according to a second modification of the fluorescence microscope apparatus in FIG. 1.
Figure 4:
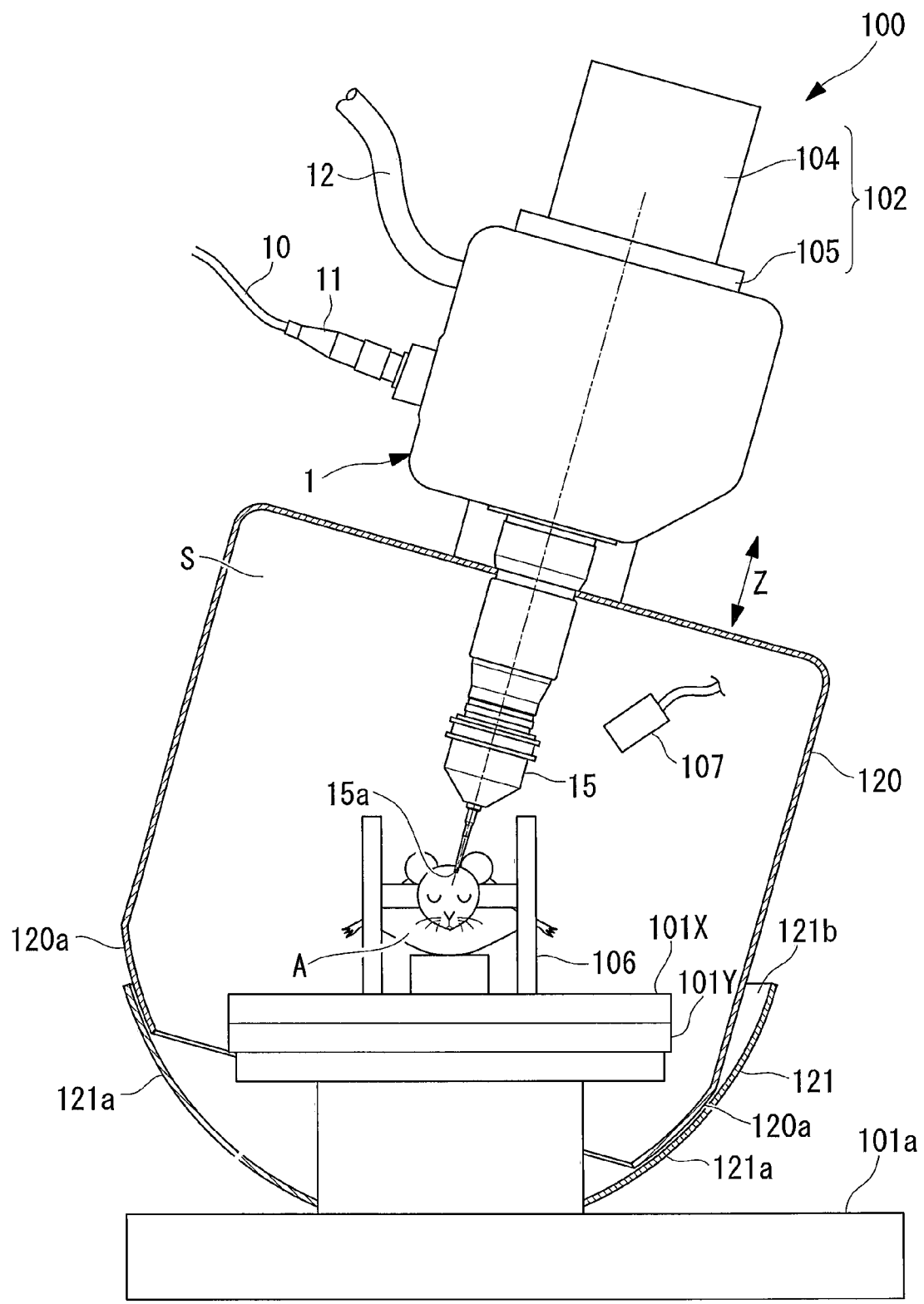
FIG. 4 is a partially cutaway elevational view showing an objective lens unit in the fluorescence microscope apparatus in FIG. 3 tilted at an angle with respect to a specimen.

In the example shown in FIGS. 3 and 4, the slider 105 is provided in such a manner that the moving mechanism 102 can move along the support stand 104, and a rotating mechanism (not shown in the drawing) for rotating the support stand 104 about a horizontal axis is provided.

In this case, a first cover member 120 is fixed to the objective lens unit 15, and a second cover member 121 is fixed to the base 101*a* of the stage 101.

The second cover member 121 includes a cylindrical-surface portion 121*a* centered on the rotation axis of the support stand 104 and side-wall portions 121*b* provided at both ends of the cylindrical-surface portion 121*a* in the width direction thereof (only one is shown in FIG. 3).

The first cover member 120 is formed in the shape of a box which encloses the space S containing the tip 15*a* of the objective lens unit 15 and includes a cylindrical-surface portion 120*a* at the lower end thereof, which is brought close to the cylindrical-surface portion 121*a* of the second cover member 121, with a minute gap therebetween, when the moving mechanism 102 is operated to dispose the tip 15*a* of the objective lens unit 15 at a fluorescence observation position.

By doing so, as shown in FIG. 4, even when the support stand 104 is rotated about the horizontal axis by operating the rotating mechanism, thus changing the angle of the objective lens unit 15 relative to the specimen A, it is possible to place the cylindrical-surface portions 120*a* and 121*a* of the first and second cover members, respectively, close to each other, with a minute gap therebetween. As a result, an advantage is afforded in that, even when the observation angle of the objective lens unit 15 is changed relative to the specimen A, it is possible to significantly reduce the entry of external light into the space S and the leakage of the excitation light outside the space S via the minute gap.

Figure 5:
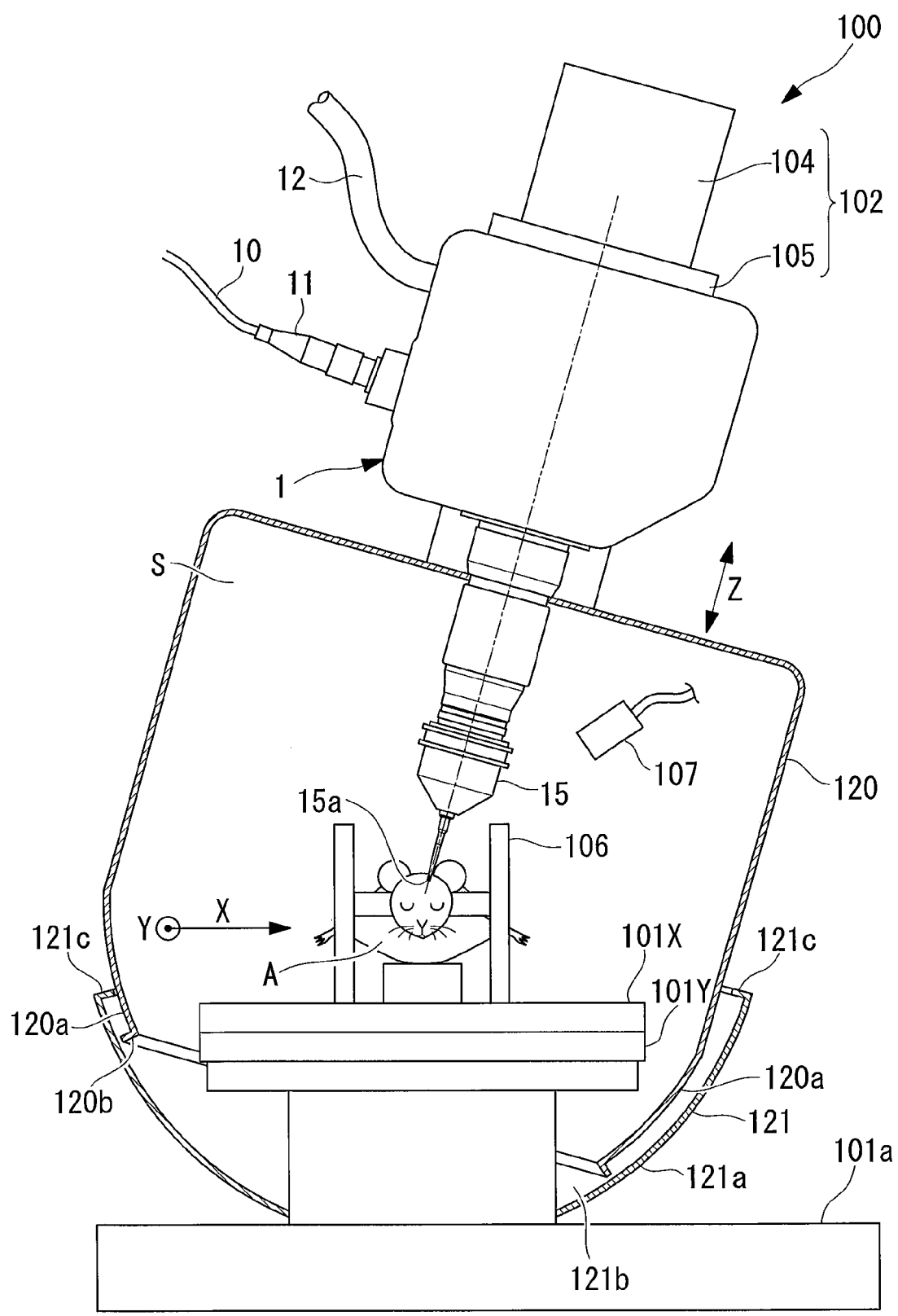
FIG. 5 is a partially cutaway elevational view showing a fluorescence microscope apparatus according to a third modification of the fluorescence microscope apparatus in FIG. 1.

In this case, as shown in FIG. 5, bent portions 120*b* and 121*c* which are bent in the direction of the minute gap may be provided at the ends of the first cover member 120 and the second cover member 121, respectively. By doing so, it is possible to more effectively prevent the entry of external light and the leakage of excitation light by means of a labyrinth effect.

A bellows member (not shown in the drawing) connected between the first cover member 120 and the stage 101 may be provided instead of the second cover member 121. By doing so, it is possible to completely prevent the entry of external light and the leakage of excitation light by completely blocking a gap existing between them, while still making it easy to move the objective lens.

Figure 6:
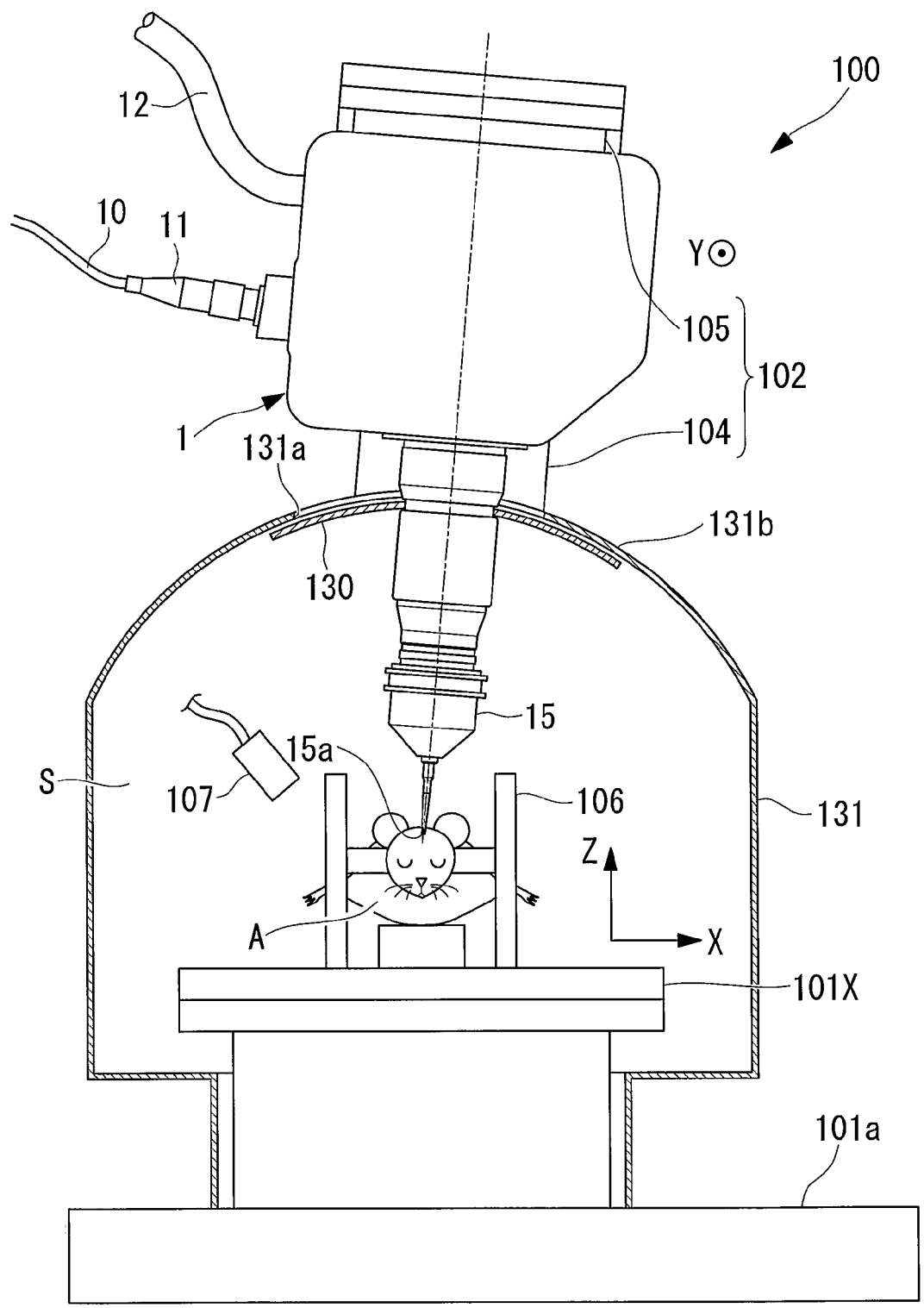
FIG. 6 is a partially cutaway elevational view showing a fluorescence microscope apparatus according to a fourth modification of the fluorescence microscope apparatus in FIG. 1.
Figure 7:
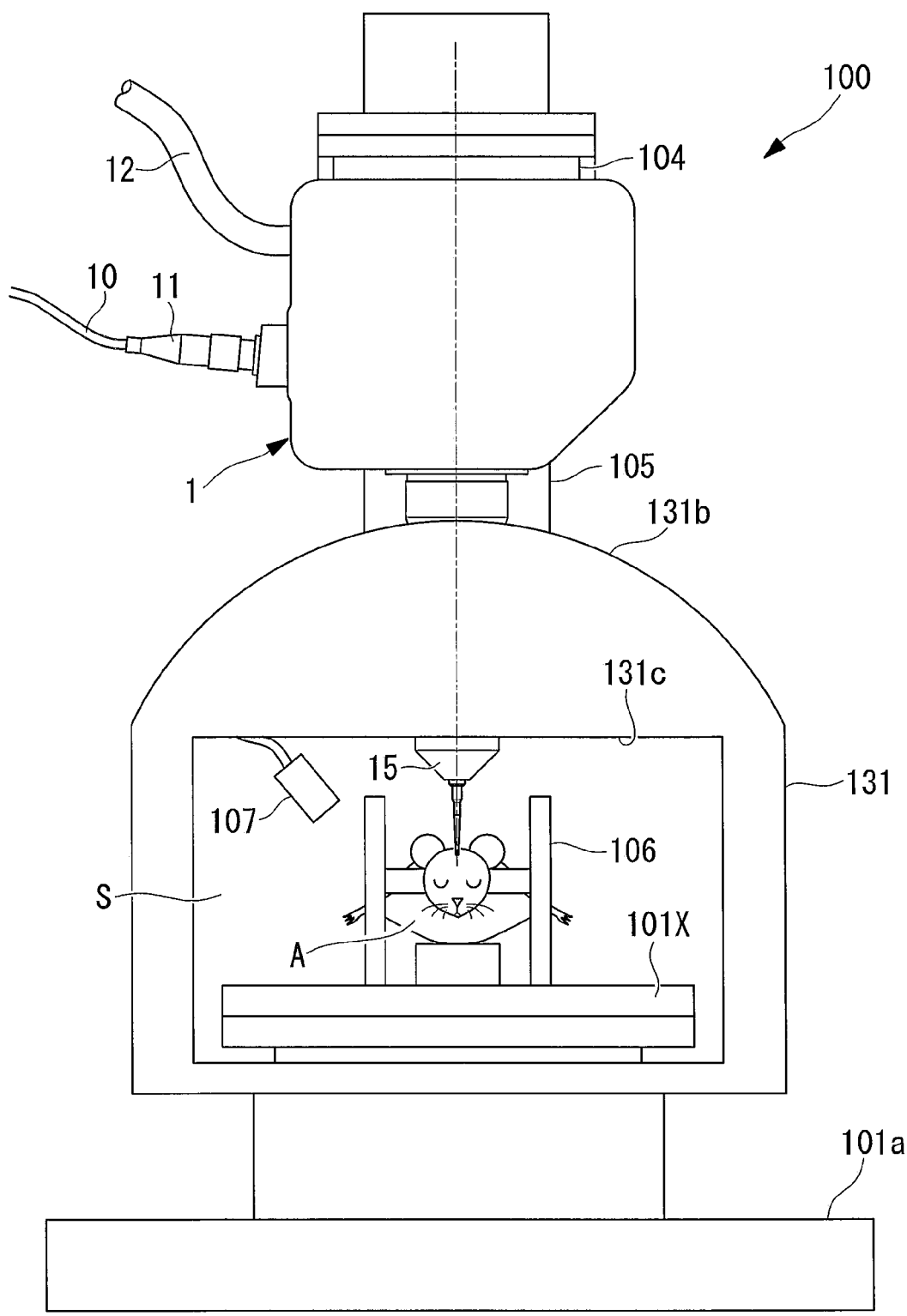
FIG. 7 is an elevational view of the fluorescence microscope apparatus in FIG. 6.
Figure 8:
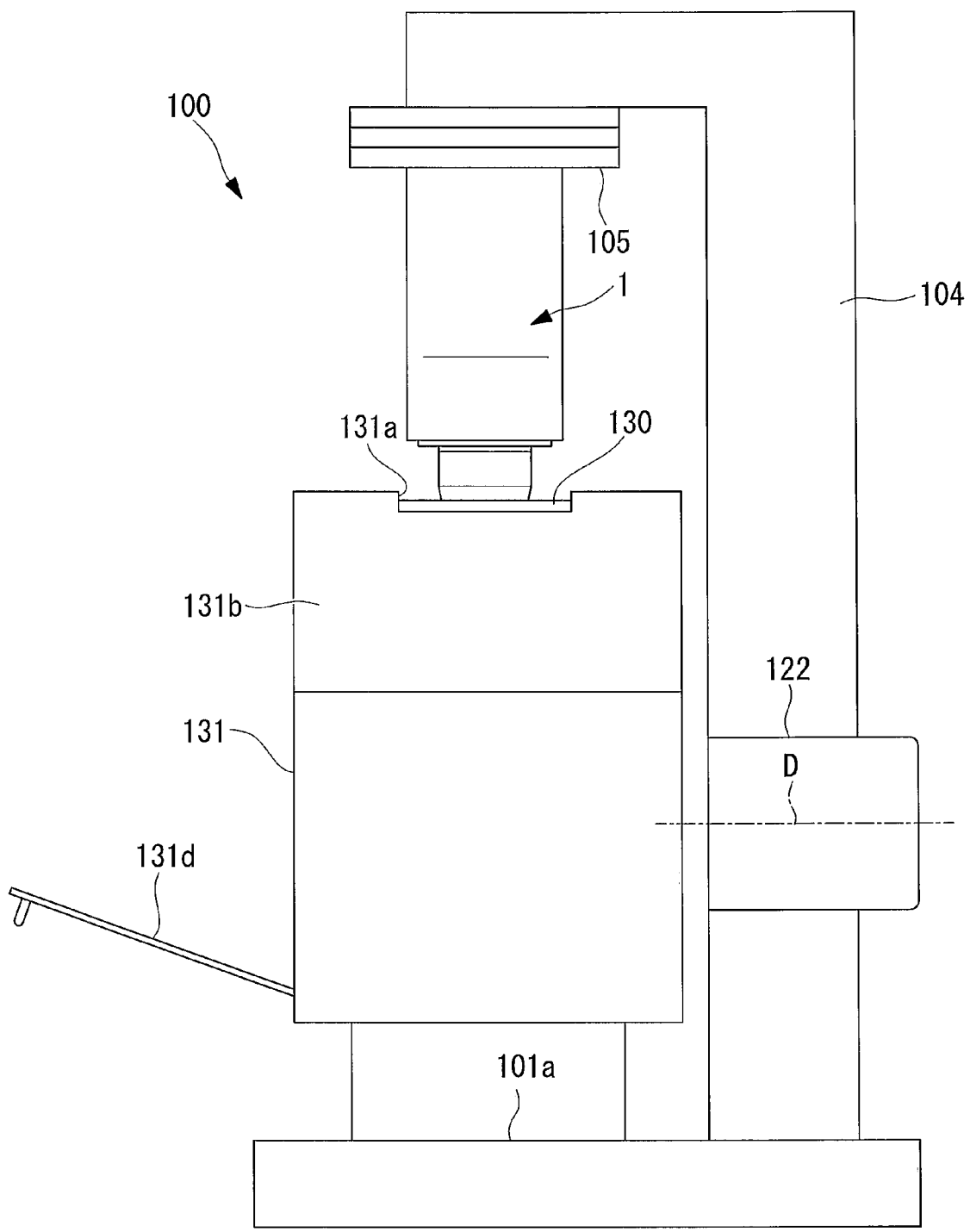
FIG. 8 is a side view of the fluorescence microscope apparatus in FIG. 6

A case in which a rotating mechanism 122 is provided for rotating the support stand 104 about a horizontal axis D (see FIG. 8) and the slider 105 is supported so as to be capable of moving along the horizontal axis D (Y direction) relative to the support stand 104 will be described with reference to FIGS. 6 to 8. In this case, the stage 101 is configured to be capable of moving the specimen A in two directions, namely, the X and Z directions.

In this case, a second cover member 131 fixed to the stage 101 should have a cylindrical-surface portion 131b having a through-hole 131a at the top thereof, and a first cover member 130 fixed to the objective lens unit 15 should be formed in the shape of a cylindrical surface disposed so that there is a minute gap between it and the cylindrical-surface portion 131b of the second cover member 131. A window 131c is preferably formed in the side wall of the second cover member 131, as shown in FIG. 7, and the window 131c is preferably configured so as to be openable and closable by means of a door 131d, as shown in FIG. 8.

Figure 9:
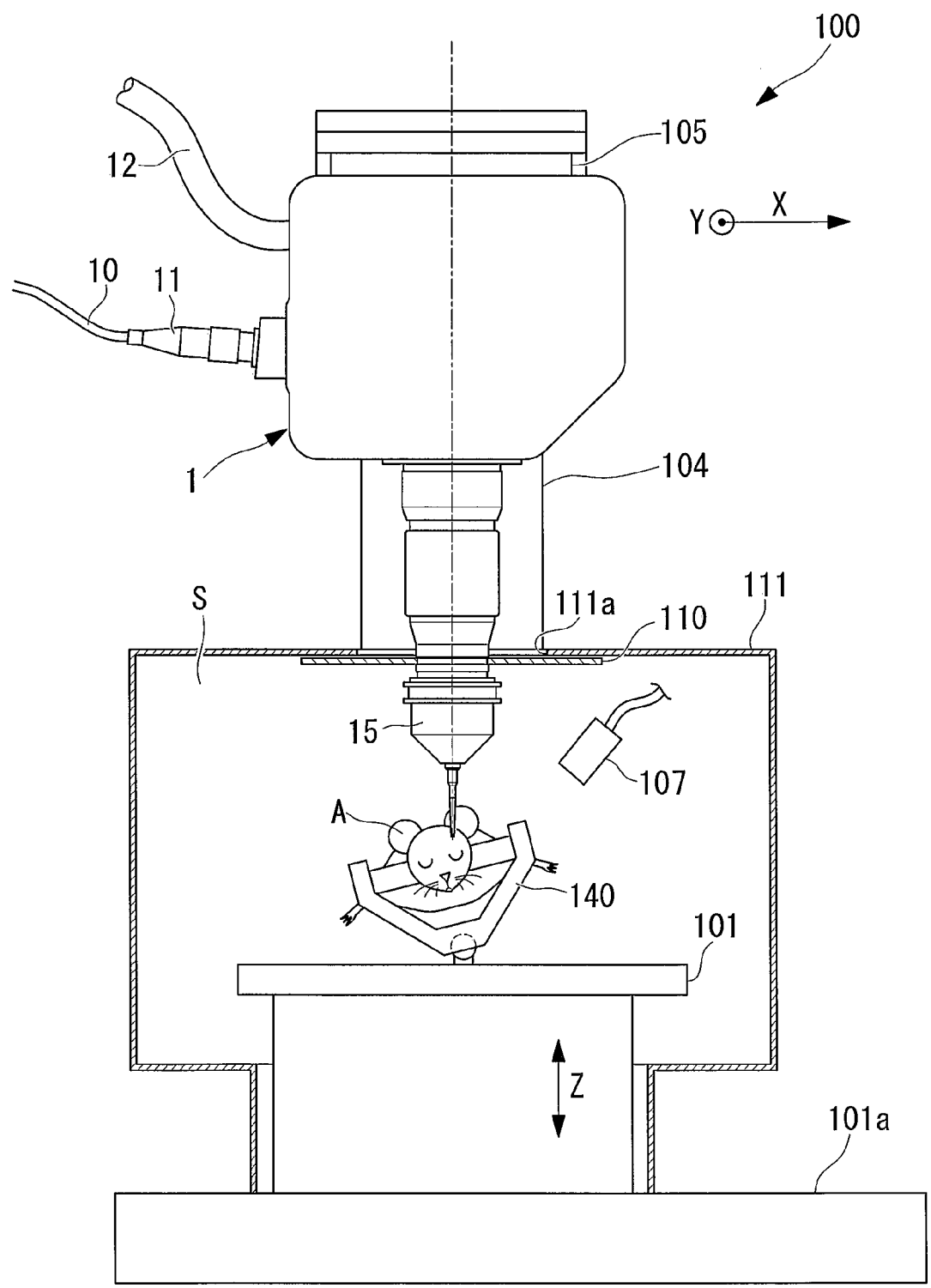
FIG. 9 is a partially cutaway elevational view showing a fluorescence microscope apparatus according to a fifth modification of the fluorescence microscope apparatus in FIG. 1.

As shown in FIG. 9, when using the same cover members 110 and 111 as those shown in FIG. 2, by employing a member with a construction that supports the specimen A while allowing it to rotate relative to the stage 101 as an immobilizing member 140 for the specimen A, the angle of the objective lens unit 15 with respect to the specimen A may be relatively changed.

Figure 10:
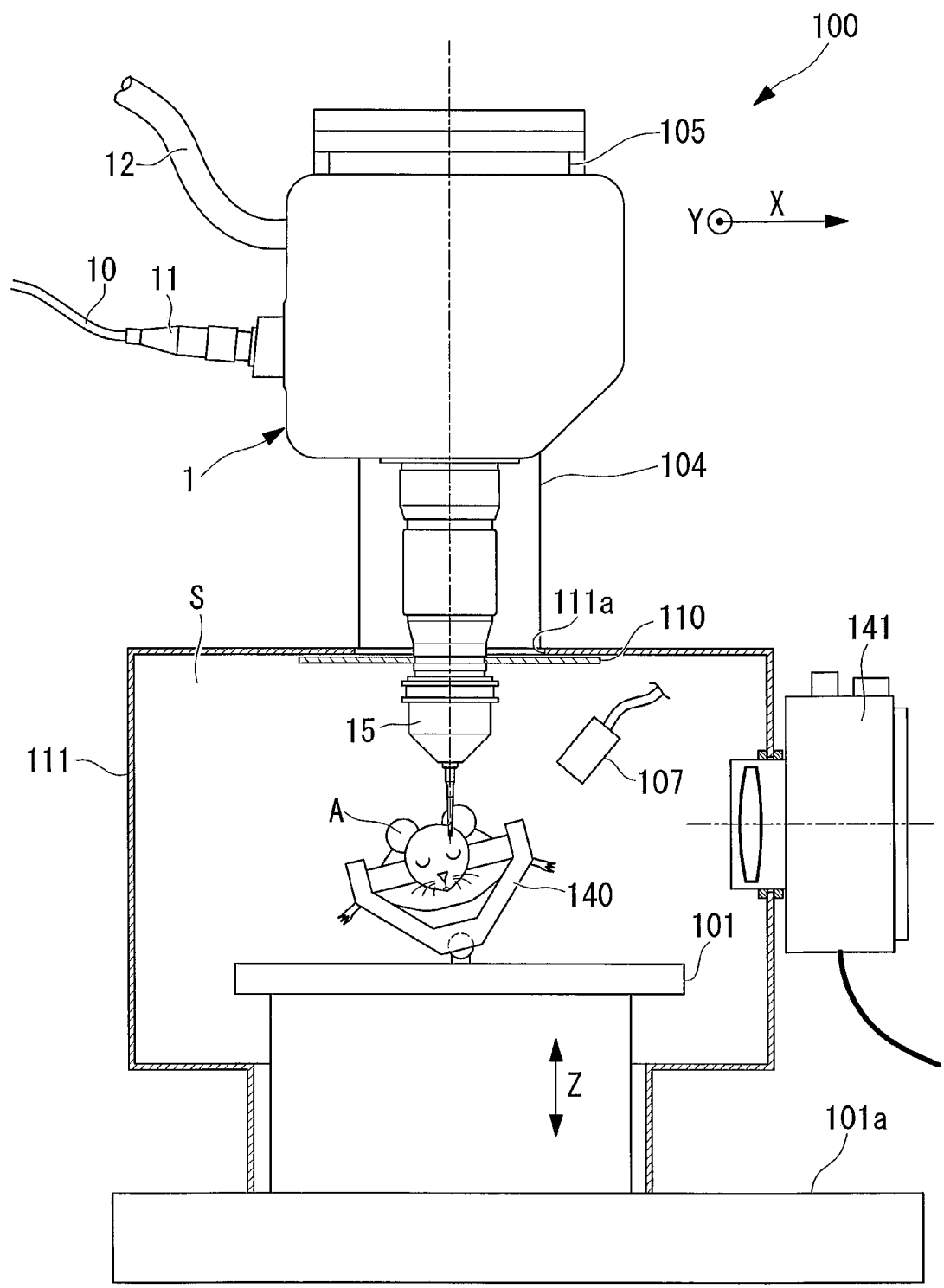
FIG. 10 is a partially cutaway elevational view showing a fluorescence microscope apparatus according to a sixth modification of the fluorescence microscope apparatus in FIG. 1.

In this case, as shown in FIG. 10, a camera 141 provided with a wide-angle lens capable of viewing the interior space S may be disposed so as to pass through the second cover member 111. Here, by configuring the immobilizing member 140 so as to be electrically operable from outside, it is possible to easily orient the tip 15a of the objective lens unit 15 relative to a desired examination site on the specimen A by operating the immobilizing member 140 while observing with the camera 141.

In this embodiment, the fluorescence microscope apparatus 100 including a compact, easily-positionable microscope main body 1 having the narrow-tip objective lens unit 15 mounted thereto has been described. Instead of this, however, as shown in FIG. 11, similar cover members may be applied to a standard large fluorescence microscope apparatus 200.

Figure 11:
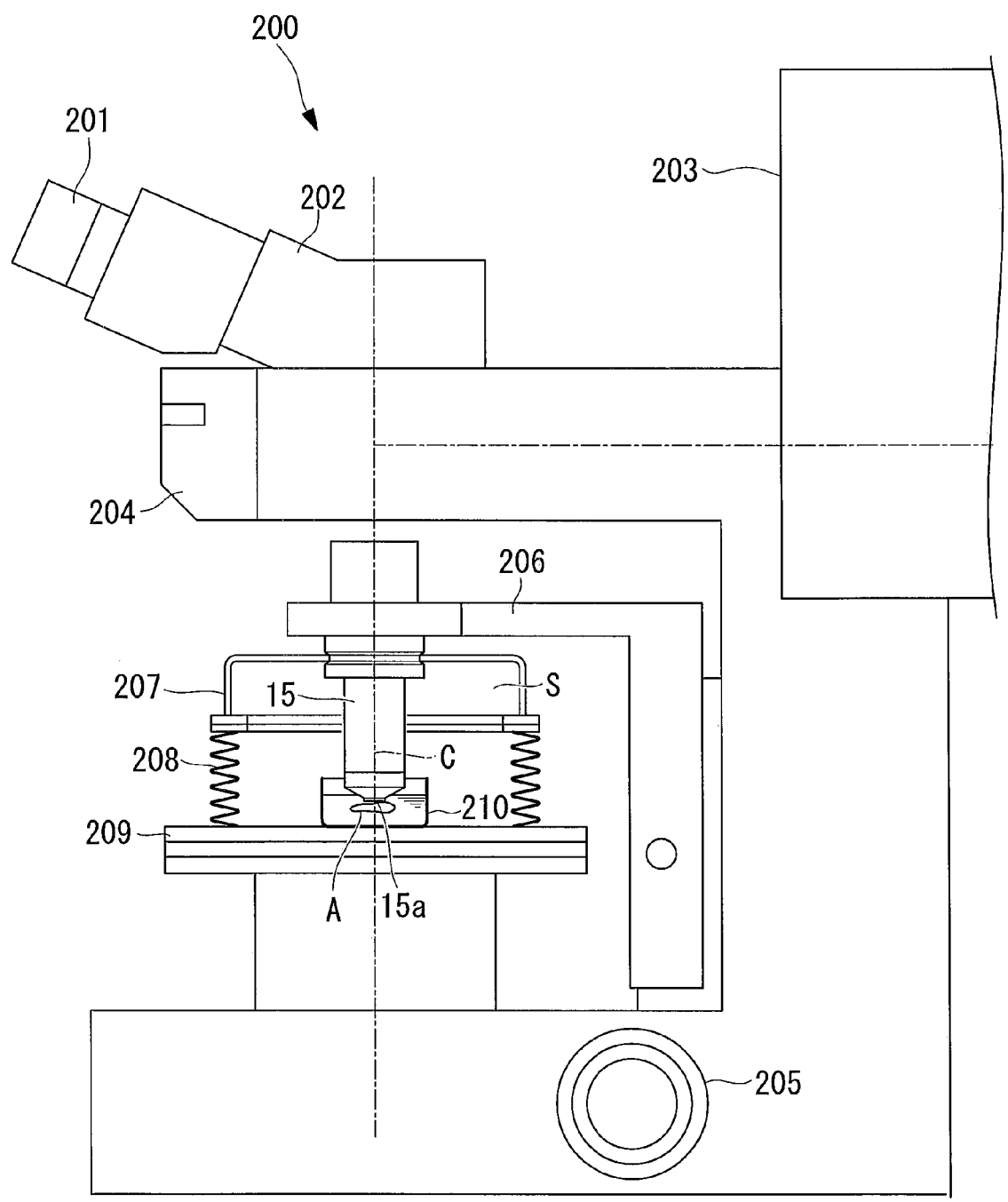
FIG. 11 is a partially cutaway elevational view showing a fluorescence microscope apparatus according to a seventh modification of the fluorescence microscope apparatus in FIG. 1.

In FIG. 11, reference numeral 201 is an eyepiece, reference numeral 202 is a lens barrel, reference numeral 203 is a scanning unit, reference numeral 204 is a cube turret, reference numeral 205 is a focusing knob, reference numeral 206 is an arm, reference numeral 207 is a first cover member, reference numeral 208 is a bellows member, reference numeral 209 is a stage (second cover member), and reference numeral 210 is a Petri dish.

With this configuration, since the space S containing the specimen A and the tip 15a of the objective lens unit 15 is enclosed by the first cover member 207, the bellows member 208, and the stage 209, the space S remains closed even when the arm 206 and the objective lens unit 15 are move up and down by operating the focusing knob 205. It is thus possible to reliably prevent the entry of external light into the space S and the leakage of excitation light from the space S.

What is claimed is:

1. A fluorescence microscope apparatus comprising:
a stage configured to mount a specimen;
an objective lens having an optical axis, the objective lens being configured to collect fluorescence from the specimen;
a moving mechanism configured to relatively move the objective lens with respect to the stage in a direction orthogonal to the optical axis;
a first cover member secured to the objective lens;
a second cover member, provided at the stage side and configured to enclose, together with the first cover member, a tip of the objective lens and a space above the stage; and
a light-blocking member configured to allow the relative movement in a direction orthogonal to the optical axis of the first and second cover members and to prevent leakage of light from a gap between the two cover members, wherein the light-blocking member is constituted by the first cover member and the second cover member, in which the second cover member overlaps the first cover member in a direction parallel to the optical axis of the first cover member, with a minute gap provided in the direction orthogonal to the optical axis therebetween.

2. A fluorescence microscope apparatus according to claim 1, wherein the second cover member is constituted of a part of the stage.

3. A fluorescence microscope apparatus according to claim 1, further comprising a specimen supporting mechanism configured to support the specimen in such a manner as to be capable of changing the angle of the specimen relative to the stage.

4. A fluorescence microscope apparatus comprising:
a stage configured to mount a specimen;
an objective lens configured to collect fluorescence from the specimen;
a moving mechanism having a rotation axis and configured to move the objective lens with respect to the stage so as to change an angle of the objective lens relative to the stage;
a first cover member having a first cylindrical-surface portion centered on the rotation axis secured to the objective lens; and
a second cover member having a second cylindrical-surface portion that overlaps with the first cylindrical-surface portion that is close to the second cylindrical-surface portion with a minute gap therebetween, the second cover member being provided at the stage side and being configured to enclose, together with the first cover member, a tip of the objective lens and a space above the stage.

* * * * *